United States Patent
Dimascio et al.

(10) Patent No.: US 9,671,030 B2
(45) Date of Patent: Jun. 6, 2017

(54) METALLIC SEAL ASSEMBLY, TURBINE COMPONENT, AND METHOD OF REGULATING AIRFLOW IN TURBO-MACHINERY

(71) Applicant: GENERAL ELECTRIC COMPANY, Schenectady, NY (US)

(72) Inventors: Paul Stephen Dimascio, Greer, SC (US); Michael Douglas Arnett, Simpsonville, SC (US); Rebecca Evelyn Hefner, Fountain Inn, SC (US); Christopher D. Higgins, Greenville, SC (US)

(73) Assignee: General Electric Company, Schenectady, NY (US)

( * ) Notice: Subject to any disclaimer, the term of this patent is extended or adjusted under 35 U.S.C. 154(b) by 980 days.

(21) Appl. No.: 13/690,233

(22) Filed: Nov. 30, 2012

(65) Prior Publication Data

US 2013/0259640 A1    Oct. 3, 2013

Related U.S. Application Data

(63) Continuation-in-part of application No. 13/436,420, filed on Mar. 30, 2012, now Pat. No. 9,169,567.

(51) Int. Cl.
*F16K 31/00* (2006.01)
*F01D 17/08* (2006.01)
(Continued)

(52) U.S. Cl.
CPC .......... *F16K 31/002* (2013.01); *F01D 11/003* (2013.01); *F01D 11/18* (2013.01);
(Continued)

(58) Field of Classification Search
CPC ..................... F01D 25/12; F01D 17/14; F05D 2300/50212; F05D 2300/505;
(Continued)

(56) References Cited

U.S. PATENT DOCUMENTS

| | | | |
|---|---|---|---|
| 1,857,961 A * | 5/1932 | Lamb | F16J 15/445 277/413 |
| 2,789,808 A | 4/1957 | Blackman | |

(Continued)

FOREIGN PATENT DOCUMENTS

| | | |
|---|---|---|
| EP | 0299049 A1 | 1/1989 |
| EP | 0377867 A2 | 7/1990 |

(Continued)

*Primary Examiner* — Craig Kim
*Assistant Examiner* — Eldon Brockman
(74) *Attorney, Agent, or Firm* — McNees Wallace & Nurick LLC (57) ABSTRACT

A metallic seal assembly, a turbine component, and a method of regulating flow in turbo-machinery are disclosed. The metallic seal assembly includes a sealing structure having thermally-responsive features. The thermally-responsive features deploy from or retract toward a surface of the sealing structure in response to a predetermined temperature change. The turbine component includes the metallic seal assembly. The method of regulating flow in turbo-machinery includes providing the metallic seal assembly and raising or retracting the thermally-responsive features in response to the predetermined temperature change.

19 Claims, 5 Drawing Sheets

(51) Int. Cl.
*F01D 11/00* (2006.01)
*F01D 11/18* (2006.01)
*F16J 15/16* (2006.01)
*F16J 15/44* (2006.01)

(52) U.S. Cl.
CPC .......... *F01D 17/085* (2013.01); *F16J 15/164* (2013.01); *F16J 15/445* (2013.01); *F05D 2300/5021* (2013.01)

(58) Field of Classification Search
CPC ... F05D 2260/22141; F05D 2260/2214; F02C 7/12; F02K 3/06; F02K 3/077; F28F 1/10; F28F 2013/008; F28F 2255/04; C08L 2201/12; Y02T 50/675; F16J 15/0806
See application file for complete search history.

(56) References Cited

U.S. PATENT DOCUMENTS

| | | | | |
|---|---|---|---|---|
| 3,038,698 A * | 6/1962 | Troyer | ............ | F01D 5/148 415/12 |
| 3,604,716 A * | 9/1971 | Webert | ............ | F16J 15/164 277/345 |
| 3,741,708 A | 6/1973 | Bernstein | | |
| 3,764,227 A | 10/1973 | Albertzart | | |
| 3,774,867 A | 11/1973 | Quinn | | |
| 3,805,882 A * | 4/1974 | Vallance | ............ | F28D 19/047 165/9 |
| 3,895,812 A * | 7/1975 | Harr, Jr. | ............ | F16J 15/0806 105/424 |
| 4,067,539 A | 1/1978 | Perl | | |
| 4,109,031 A | 8/1978 | Marscher | | |
| 4,296,599 A * | 10/1981 | Adamson | ............ | F02C 7/18 415/115 |
| 4,445,815 A | 5/1984 | Fortmann | | |
| 4,619,580 A * | 10/1986 | Snyder | ............ | F01D 5/148 415/12 |
| 4,658,847 A * | 4/1987 | McCrone | ............ | E06B 5/164 137/72 |
| 4,667,694 A | 5/1987 | Dalton | | |
| 4,697,769 A | 10/1987 | Blackwelder | | |
| 4,740,138 A | 4/1988 | Zaehring et al. | | |
| 4,787,942 A | 11/1988 | Wray | | |
| 4,813,608 A * | 3/1989 | Holowach | ............ | F02K 1/805 239/265.19 |
| 5,035,572 A | 7/1991 | Popp | | |
| 5,139,389 A | 8/1992 | Eng et al. | | |
| 5,207,558 A | 5/1993 | Hagle et al. | | |
| 5,209,438 A | 5/1993 | Wygnanski | | |
| 5,348,446 A | 9/1994 | Lee | | |
| 5,509,669 A | 4/1996 | Wolfe et al. | | |
| 5,540,788 A | 7/1996 | Defalco et al. | | |
| 5,645,897 A | 7/1997 | Andra | | |
| 5,716,052 A * | 2/1998 | Swensen | ............ | F16J 15/0887 277/608 |
| 6,016,250 A | 1/2000 | Hanners | | |
| 6,189,891 B1 | 2/2001 | Tomita et al. | | |
| 6,485,255 B1 * | 11/2002 | Care | ............ | F01D 5/187 415/12 |
| 6,652,227 B2 | 11/2003 | Fried | | |
| 6,981,676 B2 | 1/2006 | Milliere | | |
| 6,995,334 B1 | 2/2006 | Kovacevic et al. | | |
| 7,118,322 B2 | 10/2006 | Mortgat | | |
| 7,128,522 B2 * | 10/2006 | Jutras | ............ | F01D 11/006 277/359 |
| 7,195,036 B2 | 3/2007 | Burns et al. | | |
| 7,198,454 B2 * | 4/2007 | Evans | ............ | F01D 17/162 415/12 |
| 7,238,294 B2 | 7/2007 | Koops et al. | | |
| 7,384,240 B2 * | 6/2008 | McMillan | ............ | F01D 5/147 416/131 |
| 7,395,811 B2 | 7/2008 | Bellato | | |
| 7,423,236 B2 | 9/2008 | Suh | | |
| 7,445,424 B1 * | 11/2008 | Ebert | ............ | F01D 5/081 415/113 |
| 7,452,477 B2 | 11/2008 | Koops et al. | | |
| 7,537,708 B2 | 5/2009 | Peter Koops et al. | | |
| 7,667,158 B2 | 2/2010 | Dance et al. | | |
| 7,771,159 B2 | 8/2010 | Johnson et al. | | |
| 7,784,487 B2 | 8/2010 | Arnett | | |
| 7,870,738 B2 | 1/2011 | Zborovsky et al. | | |
| 7,910,854 B2 | 3/2011 | Besson et al. | | |
| 7,926,283 B2 | 4/2011 | Byrne et al. | | |
| 8,024,932 B1 | 9/2011 | Stewart | | |
| 8,210,799 B1 * | 7/2012 | Rawlings | ............ | F01D 11/005 277/654 |
| 8,434,692 B2 * | 5/2013 | Scott | ............ | F23R 3/06 137/467 |
| 8,434,999 B2 * | 5/2013 | Amaral | ............ | F01D 11/005 415/136 |
| 8,561,386 B2 * | 10/2013 | Mons | ............ | F01D 25/12 60/266 |
| 8,596,973 B2 * | 12/2013 | Grondahl | ............ | F01D 11/003 415/231 |
| 8,678,753 B2 * | 3/2014 | Farrell | ............ | F01D 5/141 415/126 |
| 2002/0006377 A1 | 1/2002 | Castner et al. | | |
| 2003/0184026 A1 | 10/2003 | Wilcox et al. | | |
| 2004/0197519 A1 * | 10/2004 | Elzey | ............ | B32B 3/28 428/68 |
| 2004/0251242 A1 | 12/2004 | Suh | | |
| 2005/0056020 A1 * | 3/2005 | Hadder | ............ | F23R 3/005 60/752 |
| 2005/0076642 A1 | 4/2005 | Reichert | | |
| 2006/0020415 A1 | 1/2006 | Hardwicke et al. | | |
| 2006/0197287 A1 * | 9/2006 | Farah | ............ | F01D 11/003 277/549 |
| 2007/0034818 A1 * | 2/2007 | Grummon | ............ | C23C 14/205 251/129.01 |
| 2007/0257119 A1 | 11/2007 | Loe et al. | | |
| 2008/0085183 A1 | 4/2008 | Durocher et al. | | |
| 2008/0241547 A1 | 10/2008 | Nalla | | |
| 2009/0024243 A1 | 1/2009 | Suh | | |
| 2009/0061232 A1 | 3/2009 | Nalla | | |
| 2009/0301094 A1 * | 12/2009 | Webster | ............ | F02K 1/10 60/771 |
| 2010/0074730 A1 | 3/2010 | Liang | | |
| 2010/0089468 A1 * | 4/2010 | Scott | ............ | F23R 3/06 137/468 |
| 2010/0300116 A1 * | 12/2010 | Kaleeswaran | ............ | F01D 9/023 60/800 |
| 2011/0030337 A1 * | 2/2011 | Mons | ............ | F01D 25/12 60/226.1 |
| 2011/0033760 A1 | 2/2011 | Clarke | | |
| 2011/0100020 A1 | 5/2011 | Zhang et al. | | |
| 2011/0129330 A1 * | 6/2011 | Farrell | ............ | F01D 5/141 415/12 |
| 2012/0279242 A1 * | 11/2012 | Seybold | ............ | F25B 40/00 62/190 |
| 2013/0255248 A1 * | 10/2013 | Dimascio | ............ | F03G 7/06 60/527 |
| 2014/0248120 A1 * | 9/2014 | Graves | ............ | F16J 15/164 415/1 |
| 2015/0083281 A1 * | 3/2015 | Lipkin | ............ | C22C 19/00 148/563 |

FOREIGN PATENT DOCUMENTS

| | | |
|---|---|---|
| EP | 0625218 B1 | 6/1996 |
| EP | 0813619 A1 | 12/1997 |
| EP | 1135326 A1 | 9/2001 |
| EP | 1363164 A1 | 11/2003 |
| EP | 1502009 B1 | 3/2009 |
| EP | 2122719 A2 | 11/2009 |
| EP | 2146071 A2 | 1/2010 |
| GB | 2084250 A | 4/1982 |
| GB | 2085083 A | 4/1982 |
| GB | 2104594 A | 3/1983 |

(56) References Cited

FOREIGN PATENT DOCUMENTS

| | | |
|---|---|---|
| GB | 2149022 A | 6/1985 |
| JP | 06163758 | 10/1994 |
| WO | 9939557 A1 | 8/1999 |

* cited by examiner

METALLIC SEAL ASSEMBLY, TURBINE COMPONENT, AND METHOD OF REGULATING AIRFLOW IN TURBO-MACHINERY

CROSS-REFERENCE TO RELATED APPLICATION

This application is a continuation-in-part of U.S. Utility application Ser. No. 13/436,420, filed Mar. 30, 2012, and entitled "COMPONENTS HAVING TAB MEMBERS," the disclosure of which is incorporated by reference in its entirety.

FIELD OF THE INVENTION

The present invention is directed to metallic seal assemblies, turbine components including metallic seal assemblies, and methods of regulating airflow in turbo-machinery with a metallic seal assembly. More particularly, the present invention relates to metallic seal assemblies having thermally-responsive features.

BACKGROUND OF THE INVENTION

Various air seals are provided in turbo-machinery systems between rotating parts and non-rotating parts. Some air seals are used for maintaining gases within a pressurized area while others are used to regulate the flow of air from one area to another.

Sealing between the various components in turbo-machinery is complicated by vibration, high temperatures, and sealing spaces that grow thermally due to operating temperatures.

Metallic seals currently used in turbo-machinery often have difficulty maintaining the seal over the range of thermal expansion during start-up, operating conditions, and shut-down experienced by the power generation system. Existing air seal arrangements in turbo-machinery still suffer from air leaks, which result in a loss of efficiency.

A metallic seal assembly, a turbine component including a metallic seal assembly, and a method of regulating airflow in turbo-machinery that do not suffer from one or more of the above drawbacks would be desirable in the art.

BRIEF DESCRIPTION OF THE INVENTION

In an exemplary embodiment, a metallic seal assembly includes a sealing structure having thermally-responsive features. The thermally-responsive features deploy from or retract toward a surface of the sealing structure in response to a predetermined temperature change.

In another exemplary embodiment, a turbine component includes a metallic seal assembly including a sealing structure having thermally-responsive features. The thermally-responsive features deploy from or retract toward a surface of the sealing structure in response to a predetermined temperature change.

In another exemplary embodiment, a method of regulating flow in turbo-machinery includes providing a metallic seal assembly having thermally-responsive features and raising or retracting the thermally-responsive features in response to a predetermined temperature change.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Provided is an exemplary metallic seal assembly, turbine component including a metallic seal assembly, and a method of regulating airflow in turbo-machinery. Embodiments of the present disclosure permit increased efficiency in the operation of turbo-machinery, permit tighter seals within turbo-machinery, permit flexibility in dimensions of seals, permit flow rates and/or volumes to be increased or decreased in response to a predetermined temperature change, prevent leakage, increase or decrease cooling or heating, or a combination thereof.

Figure 1:
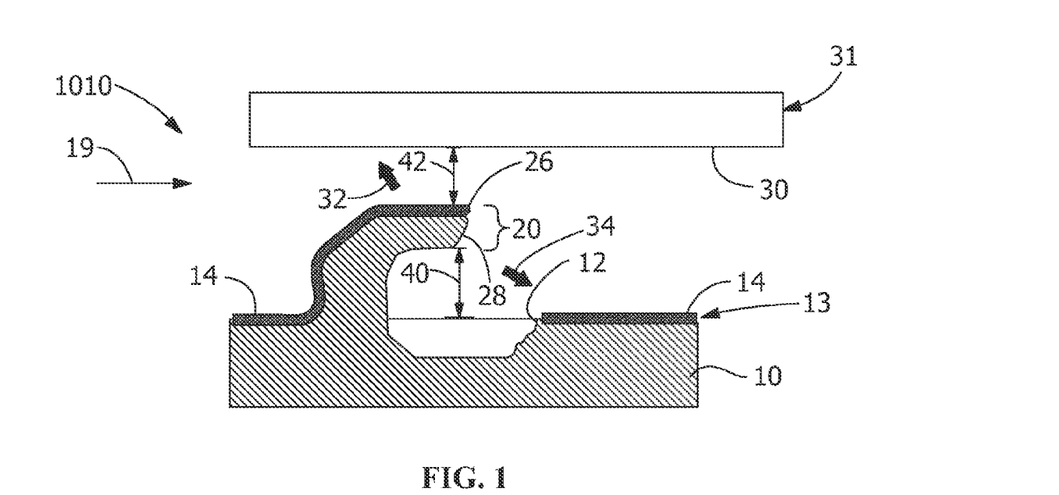
FIG. 1 is a schematic view of an exemplary metallic seal assembly according to an embodiment of the disclosure.

Referring to FIG. 1, in one embodiment, a metallic seal assembly 1010 includes a sealing structure 10 having thermally-responsive features 20 (for example, turbine-air-flow-regulating tab members). As used herein, the phrase "thermally-responsive" refers to being capable of physical movement based upon a predetermined temperature change in a direction beyond expansion and contraction. For example, such directions include, but are not limited to, those associated with flexing, bending, raising, retracting or combinations thereof. The thermally-responsive features 20 deploy from or retract toward a surface 13 of the sealing structure 10 in response to a predetermined temperature change.

In one embodiment, the thermally-responsive features 20 are capable of physical movement because a first layer 12, which may coincide with the surface 13 and/or be proximal to the surface 13 in comparison to a second layer 14, includes a first metal or metallic material and the first layer 12 is directly or indirectly positioned on the second layer 14 having a second metal or metallic material, the first metal or metallic material having a different composition than the second metal or metallic material. The first layer 12 and the second layer 14 are secured by any suitable manner, such as, by diffusion bonding, electron beam welding, laser welding, brazing, spraying, sputtering, ion plasma processing, melt-solidification, direct writing, laser cladding, plating, powder melting, laser sintering, galvanizing, or a combination thereof. Suitable spraying techniques include, but are not limited to, thermal spraying, chemical vapor deposition (CVD), physical vapor deposition (PVD), plasma spraying, detonation spraying, wire arc spraying, flame spraying, high velocity oxy-fuel coating spraying (HVOF), warm spraying, cold spraying, and combinations thereof.

The sealing structure 10 is any suitable structure including, but not limited to, existing power generation system seals, such as metal seals, metallic woven seals, metal-ceramic seals and zirconia gel-filled metal cloth seals material coated with at least one dissimilar metallic layer including MCrAlY. The first layer 12 and/or the second layer 14 of the sealing structure 10 include(s) any suitable metal or metallic material. Suitable such alloys are selected from the group consisting of nickel, iron, cobalt, stainless steel, aluminum, copper, magnesium, gold, platinum, MCrAlY (wherein M is Ni, Co, Fe, or combinations thereof), alloys thereof, 304 stainless steel substrate (available from AK Steel Corporation, West Chester, Ohio), and combinations thereof. Other suitable materials include, but are not limited to, CrMoV and NiCrMo (for example, having a low thermal expansion coefficient of about 6), INCONEL® materials, such as, but not limited to, INCONEL®625, INCONEL®718 (available from Special Metals Corporation, Huntington, W. Va.), (for example, having a medium thermal expansion coefficient of about 7), stainless steels, such as, but not limited to, 316 stainless steel (UNS 531600, an austenitic chromium, nickel stainless steel containing molybdenum) or 304 stainless steel (UNS 530400, a variation of the basic 18-8 grade, Type 302, with a higher chromium and lower carbon content) (available from AK Steel, West Chester, Ohio) (for example, having a high coefficient of thermal expansion of approximately 9).

The first layer 12 and the second layer 14 have dissimilar thermal expansion coefficients. The difference in thermal expansion coefficients (a) between the first layer 12 and the second layer 14 allows the thermally-responsive features 20 to respond to the predetermined temperature change, whether induced or environmental. The first layer 12 has a first coefficient of thermal expansion ($\alpha_1$) and the second layer 14 has a second coefficient of thermal expansion ($\alpha_2$), the first coefficient of thermal expansion ($\alpha_1$) and the second coefficient of thermal expansion ($\alpha_2$) differ by a predetermined amount to achieve a desired response based upon the predetermined temperature change. Suitable differences include, but are not limited to, a difference of about 3%, about 5%, about 7%, about 10%, between about 3% and about 5%, between about 3% and about 7%, an order of magnitude of 1.1, an order of magnitude of 1.5, an order of magnitude of 2, an order of magnitude between 1.1 and 2, or any suitable combination, sub-combination, range, or sub-range thereof, an order of magnitude being based upon how much deflection is desired, given a predetermined temperature change, based upon bimetallic beam bending calculations for a given material set and feature/beam geometry.

Figure 2:
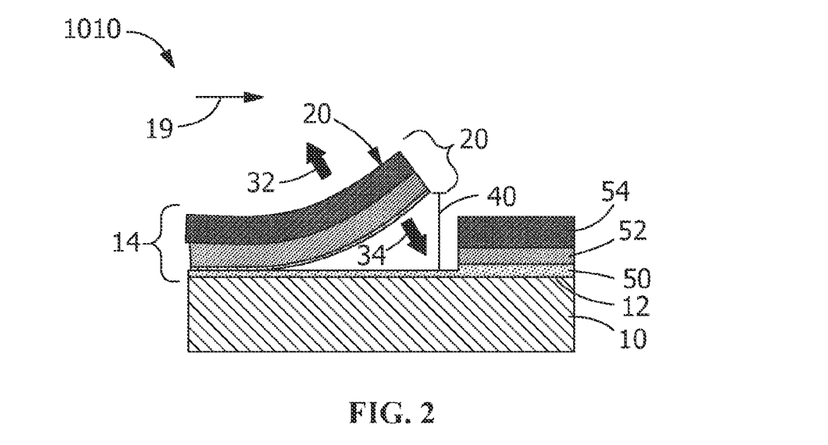
FIG. 2 is a schematic view of an exemplary metallic seal assembly according to an embodiment of the disclosure.
Figure 3:
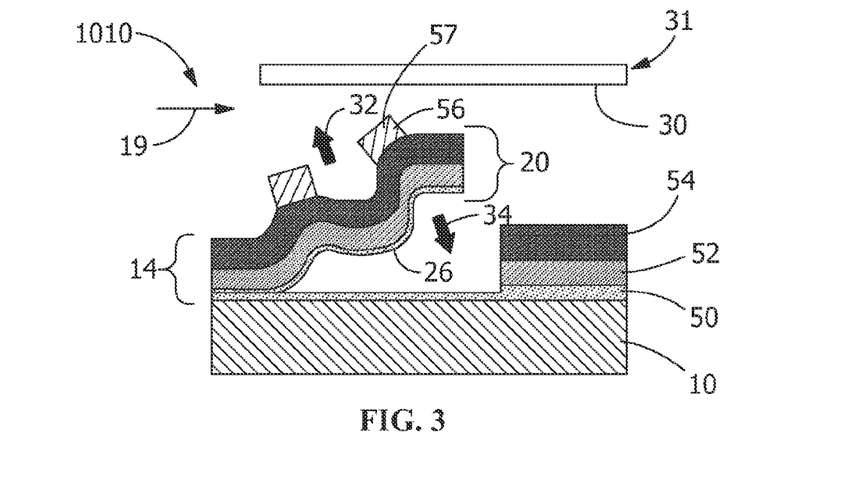
FIG. 3 is a schematic view of an exemplary metallic seal assembly according to an embodiment of the disclosure.

In one embodiment, the thermally-responsive features 20 are positioned to deploy up away from the surface 13, for example, in a raising direction 32 as shown in FIGS. 1-3. Additionally or alternatively, the thermally-responsive features 20 are positioned to retract toward the surface 13 in a retracting direction 34 as shown in FIGS. 1-3. To deploy up away from the surface 13 in the raising direction 32, for example, toward an adjacent surface 30 to close a gap 42 as is shown in FIGS. 1 and 3, and/or reduce air flow volume and/or rate in response to the predetermined temperature change being an increase in temperature, the first coefficient of thermal expansion ($\alpha_1$) is greater than the second coefficient of thermal expansion ($\alpha_2$). To retract toward the surface 13 in the retracting direction 34, for example, away from the adjacent surface 30 to create and/or increase the gap 42 as is shown in FIGS. 1 and 3, and/or increase air flow volume and/or rate in response to the predetermined temperature change being an increase in temperature, the first coefficient of thermal expansion ($\alpha_1$) is less than the second coefficient of thermal expansion ($\alpha_2$). In one embodiment, the thermally-responsive features 20, in response to the predetermined temperature, adjust in height 40 (see FIGS. 1-2), for example, from the surface 13, within a predetermined range, such as, between about 10% and about 50%, between about 15% and about 45%, between about 20% and about 30%, or any suitable combination, sub-combination, range, or sub-range therein.

Figure 11:
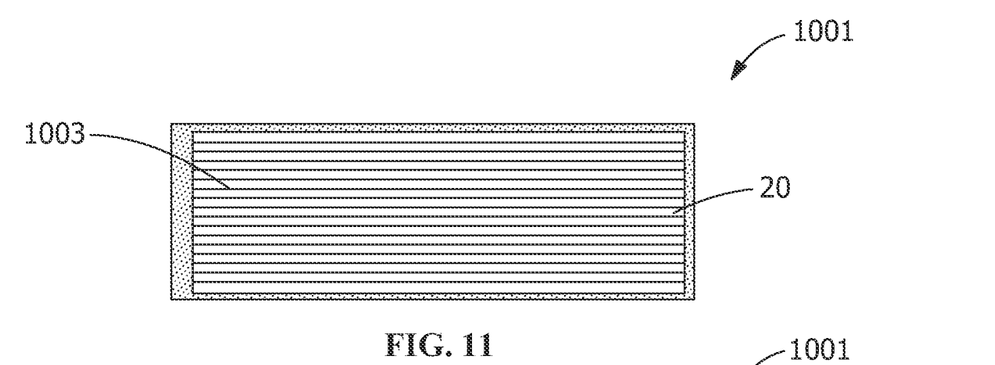
FIG. 11 is a schematic view of an exemplary pattern for thermally-responsive features according to an embodiment of the disclosure.
Figure 12:
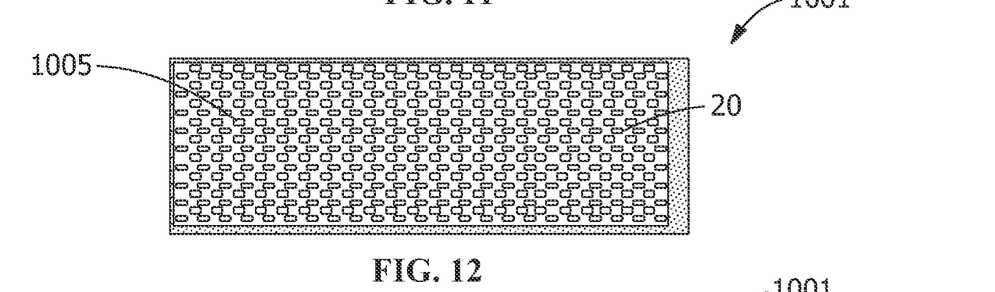
FIG. 12 is a schematic view of an exemplary pattern for thermally-responsive features according to an embodiment of the disclosure.
Figure 13:
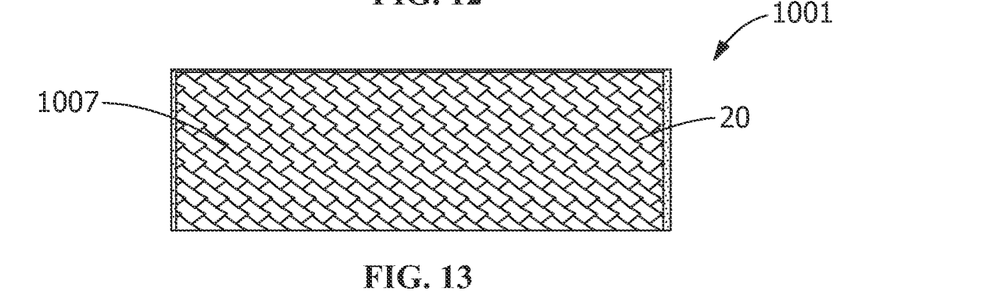
FIG. 13 is a schematic view of an exemplary pattern for thermally-responsive features according to an embodiment of the disclosure.
Figure 14:
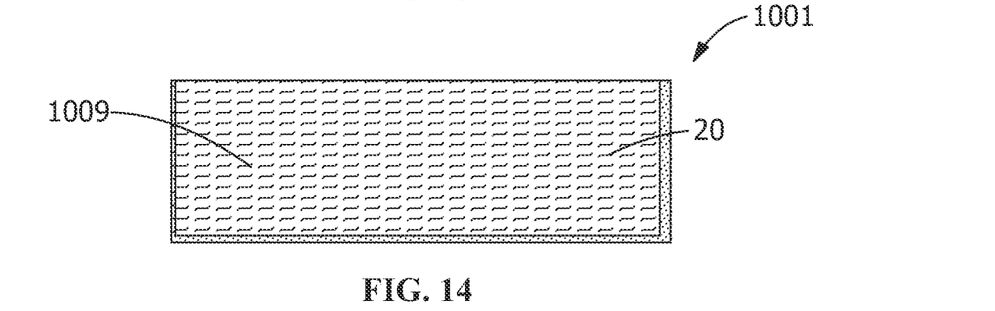
FIG. 14 is a schematic view of an exemplary pattern for thermally-responsive features according to an embodiment of the disclosure.

In one embodiment, the thermally-responsive features 20 are formed by cutting or penetrating at least a portion 28 of the sealing structure 10 and the second layer 14, thereby creating the thermally-responsive features 20 in the surface 13 of the sealing structure 10. Suitable methods for forming plurality of thermally-responsive features 20, include, but are not limited to, laser surface sculpting, breaking, fracturing or disrupting a brittle layer, applying a pulsed laser, applying targeted mechanical shock and/or mechanical stress, or a combination thereof. In one embodiment, the thermally-responsive features 20 are sculpted into means for forming a pattern 1001, such as, but not limited to, rows or lines 1003 (see FIG. 11), dashed rows/lines 1005 (see FIG. 12), fish scales 1007 (see FIG. 13), zigzags 1009 (see FIG. 14), slots or elongate holes, other desired patterns, or a combination thereof.

Figure 4:
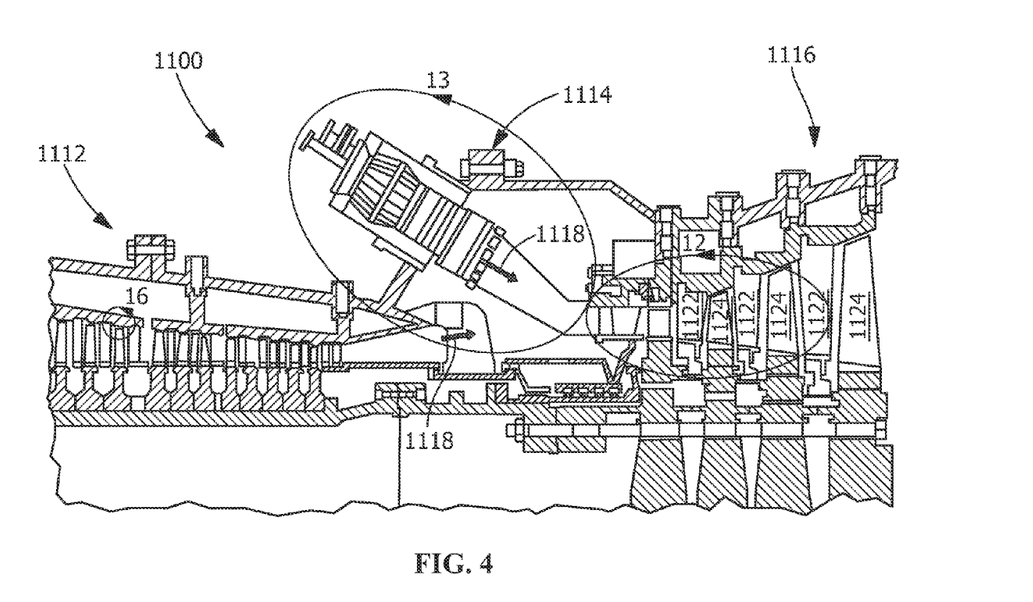
FIG. 4 is a schematic view of turbo-machinery having flow regulated according to an embodiment of the disclosure.
Figure 5:
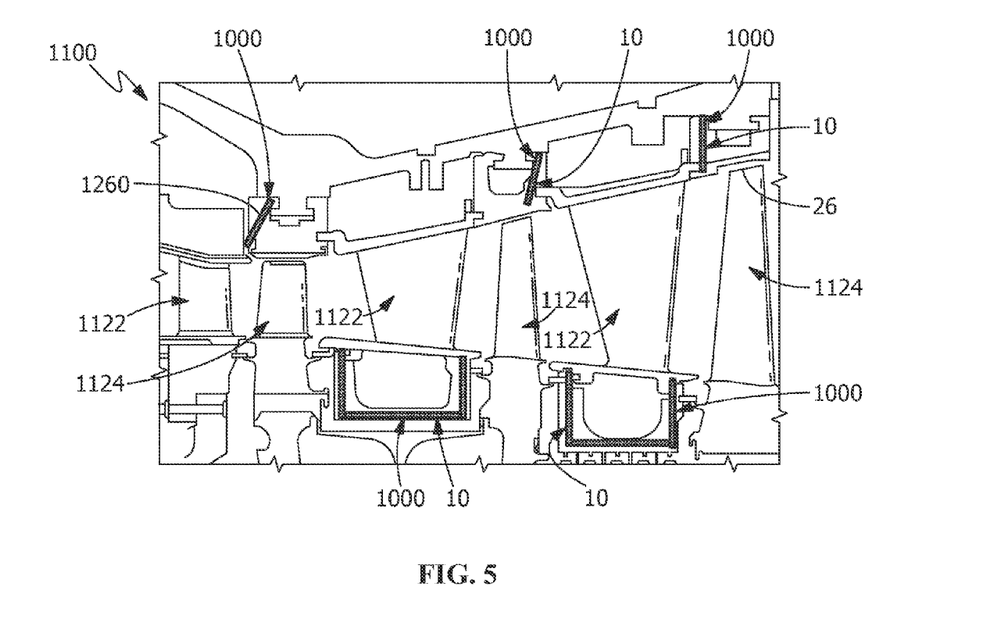
FIG. 5 is a schematic view of turbo-machinery having flow regulated according to an embodiment of the disclosure.

Referring to FIG. 2, in one embodiment, the metallic seal assembly 1010 restricts air flow 19, for example, in a power generation system 1100 as is shown in FIGS. 4 and 5. As temperature increases resulting in the predetermined temperature change, the thermally-responsive features 20 reposition toward and/or press against the adjacent surface 30, for example, of a separate body 31 sealing and/or restricting the air flow 19. Additionally or alternatively, the thermally-responsive features 20 increase and/or throttle the air flow 19. For example, as temperature increases resulting in the predetermined temperature change, the thermally-responsive features 20 retract toward the surface 13 of the sealing structure 10 and/or away from the adjacent surface 30 of separate body 31, thereby increasing the rate and/or volume of the air flow 19 through the gap 42.

Referring again to FIGS. 2 and 3, in one embodiment, the second layer 14 includes a first metallic layer 50 and a second metallic layer 52, the first metallic layer 50 being distal from the surface 13 in comparison to the second metallic layer 52. In further embodiments, the second layer 14 further includes a third metallic layer 54 and/or a fourth metallic layer 56 (see FIG. 3), the third metallic layer 54 being positioned opposite the first metallic layer on the second metallic layer 52 and the fourth metallic layer 56 being positioned proximal to the surface 13 in comparison to the third metallic layer 54. In one embodiment, the first metallic layer 50, the second metallic layer 52, the third metallic layer 54, the fourth metallic layer 56, or a combination thereof, have different thermal expansion coefficients and/or form at least a portion of the thermally-responsive features 20.

Referring again to FIG. 3, in one embodiment, the thermally-responsive features 20 include one or more layered portions 26, the layered portion(s) 26 including the first metallic layer 50, the second metallic layer 52, and the third metallic layer 54. In one embodiment, the first metallic layer 50 is a weaker or more brittle metallic layer than the second metallic layer 52 and/or the third metallic layer 54. As used herein, "brittle" refers to being less ductile. In one embodiment, the first metallic layer 50 is a material with a tensile elongation at failure of less than about 10%, a porosity between about 0% or 1% by volume and about 50% by volume, or a combination thereof. In a further embodiment, the first metallic layer 50 is configured to be broken when mechanical stress or other stress is applied.

The third metallic layer 54 is a strong metallic layer having a different coefficient of thermal expansion ($\alpha$) than the second metallic layer 52. In one embodiment, the third metallic layer 54 is selected from a material having a coefficient of thermal expansion ($\alpha$) that is up to about the same or about 20% different than the first metallic layer 50 and/or the second metallic layer 52. The 20% difference is either greater than or less than, depending on the desired movement of thermally-responsive features 20. Misfit strain ($\epsilon$) is the difference between the coefficients of thermal expansion ($\alpha$) for a temperature gradient and is calculated using the following equation:

$$\epsilon = (\alpha_1 - \alpha_2) \Delta T$$

where $\epsilon$ is misfit strain; $\alpha_1$ and $\alpha_2$ are the coefficient of thermal expansion of two layers; and $\Delta T$ is the temperature gradient, which is the current temperature minus the reference temperature. The reference temperature is the temperature at which the thermally-responsive features 20 have no flexure or movement. In one embodiment, the predetermined temperature change results in a misfit strain of at least about 8%, for example, between the second metallic layer 52 and the third metallic layer 54.

Suitable examples of materials for the first metallic layer 50 include, but are not limited to, nickel-aluminum, titanium-aluminum, nickel-chromium carbide, cobalt-chromium carbide, alloys thereof and combinations thereof. Suitable examples of materials for the second metallic layer 52 and the third metallic layer 54 include, but are not limited to, nickel, iron, cobalt, stainless steel, aluminum, copper, magnesium, gold, platinum, MCrAlY, wherein M is Ni, Co, Fe, or combinations thereof, alloys thereof, and combinations thereof. In an embodiment where the thermally-responsive features 20 deploy from the surface 13 (for example, in the raising direction 32), the first metallic layer 50 and/or the second metallic layer 52 have higher coefficients of thermal expansion than the coefficient of thermal expansion for the third metallic layer 54 and/or adjust in the raising direction 32 upon the predetermined temperature change being an increase in temperature. In an embodiment where the thermally-responsive features 20 retract toward the surface 13, (for example, in the retracting direction 34), the first metallic layer 50 and/or the second metallic layer 52 have lower coefficients of thermal expansion than the coefficient of thermal expansion for the third metallic layer 54 and/or adjust in the retracting direction 34 upon the predetermined temperature change being an increase in temperature.

Referring to FIG. 3, in one embodiment, protrusions 57 are positioned on the thermally-responsive features 20. The protrusions 57 are formed by any suitable techniques, such as, by laser sculpting the thermally-responsive features 20. In one embodiment, the protrusions 57 are a discontinuous top layer, capable of altering the shape of the thermally-responsive features 20 based upon differing coefficients of thermal expansion. For example, such altering is capable of generating a wavy set of thermally-responsive features 20, increasing turbulence and/or boundary layer thickness.

Referring to FIGS. 4 and 5, in one embodiment, thermally-responsive features 20 regulate flow and/or leakage (for example, from hot gas flow path 1118) in turbo-machinery, for example, by raising or retracting in response to the predetermined temperature change. In one embodiment, the turbo-machinery is a power generation system 1100, having a compressor section 1112, a combustor section 1114, and a turbine section 1116. In a further embodiment, the turbine section 1116 includes alternating rows of stationary airfoils 1122 (commonly referred to as vanes) and rotating airfoils 1124 (commonly referred to as blades). In one embodiment, the metallic seal assemblies 1010 are positioned adjacent to the stationary airfoils 1122 and/or adjacent to the rotating airfoils 1124.

Figure 6:
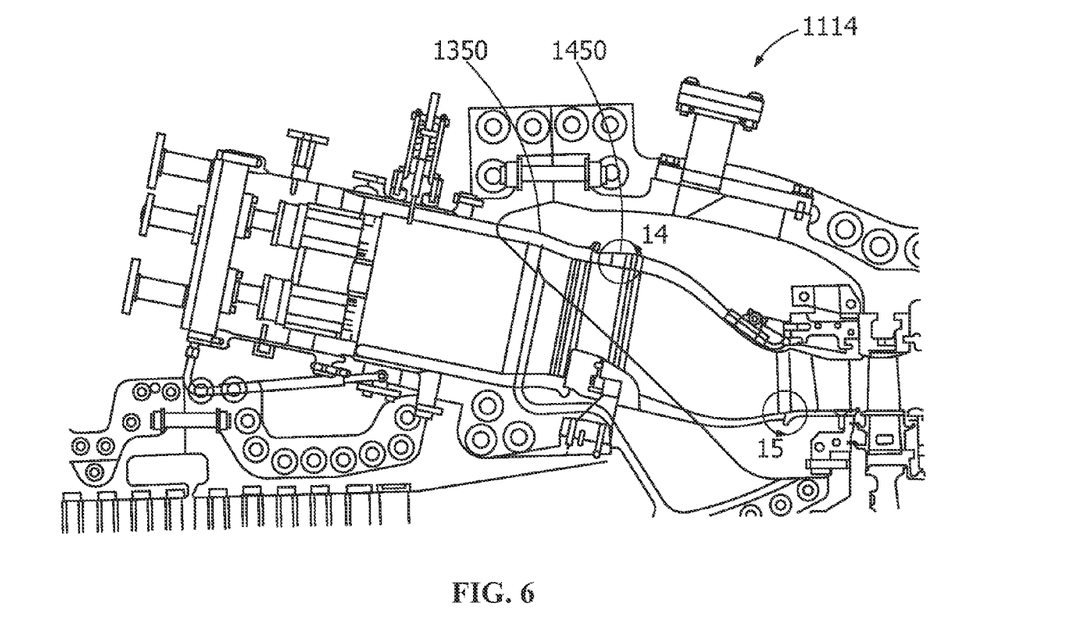
FIG. 6 is a schematic view of turbo-machinery having flow regulated according to an embodiment of the disclosure.
Figure 7:
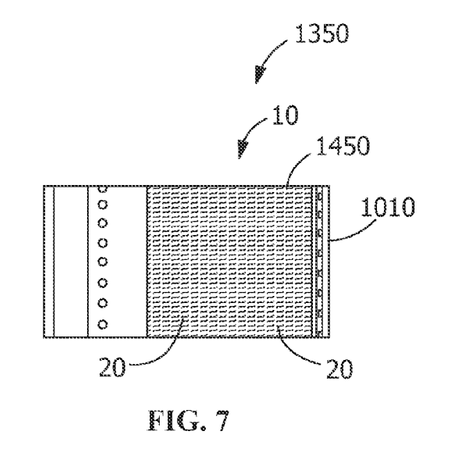
FIG. 7 is a schematic view of an annual cam combustor of the turbo-machinery shown in FIG. 6.
Figure 8:
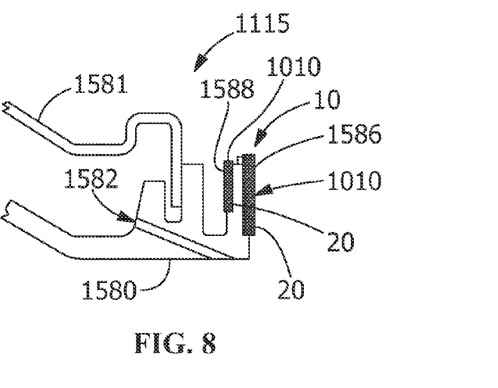
FIG. 8 is a schematic view of a transition piece of the turbo-machinery shown in FIG. 6.

Referring to FIGS. 6-8, in one embodiment, the metallic seal assembly 1010 is within the combustor section 1114 of the power generation system 1100 and includes an annular can combustor 1350 and a transition piece 1115. The metallic seal assembly 1010 is positioned with the thermally-responsive features 20 oriented to achieve desired flow characteristics. Referring to FIG. 7, in one embodiment, the annular can combustor 1350 includes a hula seal 1450 having the metallic seal assembly 1010 applied thereon. Referring to FIG. 8, in one embodiment, the transition piece 1115 includes a body 1581 and an aft frame 1580. The aft frame 1580 includes cooling hole 1582 and a side seal 1586 and inner seal 1588. The side seal 1586 and the inner seal 1588 include the metallic seal assembly 1010.

Figure 9:
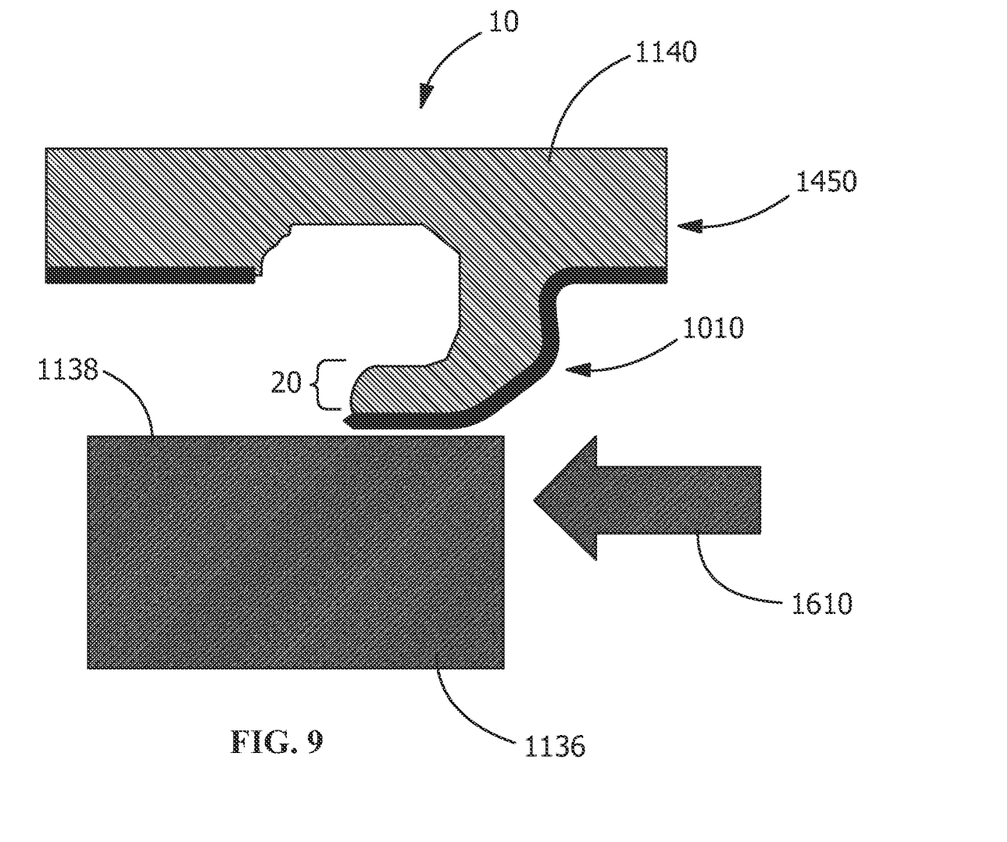
FIG. 9 is a schematic view of an exemplary component according to an embodiment of the disclosure.
Figure 10:
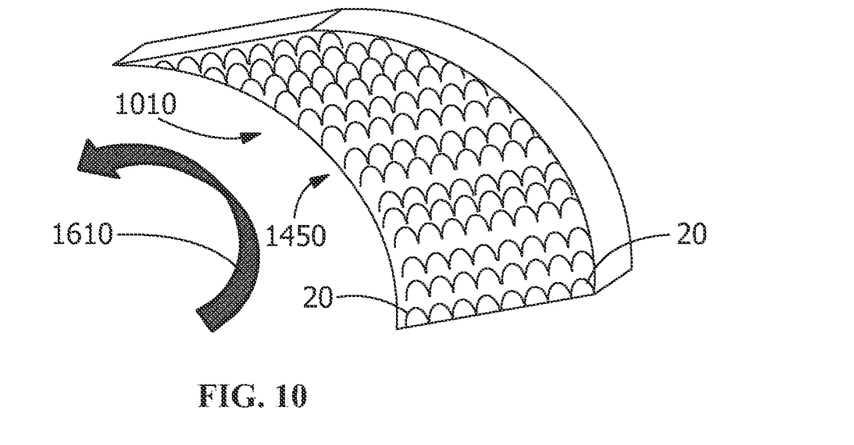
FIG. 10 is a schematic view of an exemplary component having an arcuate geometry according to an embodiment of the disclosure.

Referring to FIGS. 9 and 10, in one embodiment, a turbine component, such as a compressor casing 1140, includes the thermally-responsive features 20, arranged in a substantially planar orientation or an arcuate orientation as is shown in FIG. 10. The thermally-responsive features 20 are adjacent to a blade tip 1138 of a compressor blade 1136. The compressor blade 1136 has a rotational direction 1610. In this embodiment, efficiency is increased during operation, especially during start-up and shut-down, due to the thermally-responsive features 20 regulating flow. Additionally or alternatively, the thermally-responsive features 20 permit the metallic seal assemblies 1010 to have narrower clearance tolerances between the compressor blades 1136 and the compressor casing 1140, based upon differences between set-up temperature, start-up temperature, operational temperature, and/or shut-down temperature, thereby reducing tip-rub events.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A metallic seal assembly, comprising:
a sealing structure having a structure surface, the sealing structure comprising a base layer of a base material and a surface layer of a surface material on the base layer, an upper surface of the surface layer forming the structure surface;
a plurality of thermally-responsive features, each of the plurality of thermally-responsive features extending from the sealing structure and comprising a first metallic layer and a second metallic layer, the first metallic layer being integral with the base layer and formed of the base material and the second metallic layer being integral with the surface layer and formed of the surface material; and
a body having an adjacent surface;
wherein the plurality of thermally-responsive features deploy from or retract toward the structure surface of the sealing structure to regulate flow in a gap between the structure surface and the adjacent surface and to form or break a seal between the sealing structure and the body in response to a predetermined temperature change.

2. The metallic seal assembly of claim 1, wherein one or both of the first metallic layer and the second metallic layer include material selected from the group consisting of nickel, iron, cobalt, stainless steel, aluminum, copper, magnesium, gold, platinum, MCrAlY, and combinations thereof.

3. The metallic seal assembly of claim 1, wherein the thermally-responsive features include a portion of the metallic seal assembly.

4. The metallic seal assembly of claim 1, wherein the metallic seal assembly is a metallic woven seal assembly.

5. The metallic seal assembly of claim 1, wherein the first metallic layer has a first coefficient of thermal expansion and the second metallic layer has a second coefficient of thermal expansion, the first coefficient of thermal expansion and the second coefficient of thermal expansion being different by at least about 5%.

6. The metallic seal assembly of claim 1, wherein the first metallic layer has a first coefficient of thermal expansion and the second metallic layer has a second coefficient of thermal expansion, the first coefficient of thermal expansion and the second coefficient of thermal expansion being different by between about 1.1 and 2 times.

7. The metallic seal assembly of claim 1, wherein the thermally-responsive features are gas-turbine-air-flow-regulating tab members.

8. The metallic seal assembly of claim 1, wherein the thermally-responsive features change in height with respect to the surface of the sealing structure by greater than about 10% in response to a predetermined temperature change.

9. The metallic seal assembly of claim 1, wherein the thermally-responsive features comprise the first metallic layer applied to the surface of the sealing structure, the second metallic layer applied to the first metallic layer, and a third metallic layer applied to the second metallic layer.

10. The metallic seal assembly of claim 9, wherein the first metallic layer is selected from the group of alloys consisting of nickel-aluminum alloys, titanium-aluminum alloys, nickel-chromium carbide alloys, cobalt-chromium carbide alloys, and combinations thereof.

11. The metallic seal assembly of claim 9, wherein the first metallic layer comprises a material having a tensile elongation at failure of less than about 10%.

12. The metallic seal assembly of claim 9, wherein the first metallic layer has a porosity, by volume, of between about 1% and about 50%.

13. The metallic seal assembly of claim 1, wherein the metallic seal assembly is a compressor casing.

14. A turbine component, comprising:
a metallic seal assembly including a sealing structure, a plurality of thermally-responsive features extending from the sealing structure, and a body having an adjacent surface, the sealing structure having a structure surface and each of the plurality of thermally-responsive features comprising a first metallic layer and a second metallic layer;
wherein the thermally-responsive features are integral with and surface sculpted from the sealing structure and are formed of materials of the sealing structure; and
wherein the plurality of thermally-responsive features deploy from or retract toward the structure surface of the sealing structure to regulate flow in a gap between the structure surface and the adjacent surface and to form or break a seal between the sealing structure and the body in response to a predetermined temperature change.

15. The turbine component of claim 14, wherein the turbine component is selected from the group consisting of a transition piece seal assembly, a hula seal assembly, a hot gas flow path component, and combinations thereof.

16. A method of regulating flow in turbo-machinery, the method comprising:
providing a metallic sealing assembly, the metallic sealing assembly comprising a sealing structure, a plurality of thermally-responsive features extending from the sealing structure, and a body having an adjacent surface, the sealing structure having a structure surface and each of the plurality of thermally-responsive features comprising a first metallic layer and a second metallic layer, the thermally-responsive features being formed from the sealing structure by laser surface sculpting; and
raising or retracting the thermally-responsive features to form or break a seal and to close or create a gap in the turbo-machinery between the structure surface and the adjacent surface, thereby regulating flow in the gap, in response to a predetermined temperature change.

17. The method of claim 16, further comprising increasing or decreasing fluid flow within the turbo-machinery in response to the temperature change.

18. A metallic seal assembly, comprising:
a sealing structure having a structure surface;
a plurality of thermally-responsive features extending from the sealing structure, at least a portion of each of the thermally-responsive features being integral with the sealing structure and being formed of at least one material of the sealing structure; and
a body having an adjacent surface;
wherein the thermally-responsive features deploy from the structure surface of the sealing structure to press against the adjacent surface and close a gap between the structure surface and the adjacent surface, thereby forming a seal between the sealing structure and the body, or retract toward the structure surface of the sealing structure and away from the adjacent surface, thereby breaking the seal to create the gap, in response to a predetermined temperature change to regulate flow in the gap between the structure surface and the adjacent surface.

19. The metallic seal assembly of claim 18, wherein the thermally-responsive features comprise a first metallic layer having a first coefficient of thermal expansion and a second metallic layer having a second coefficient of thermal expansion, the first coefficient of thermal expansion and the second coefficient of thermal expansion being different by at least about 5%.

* * * * *